UNITED STATES PATENT OFFICE.

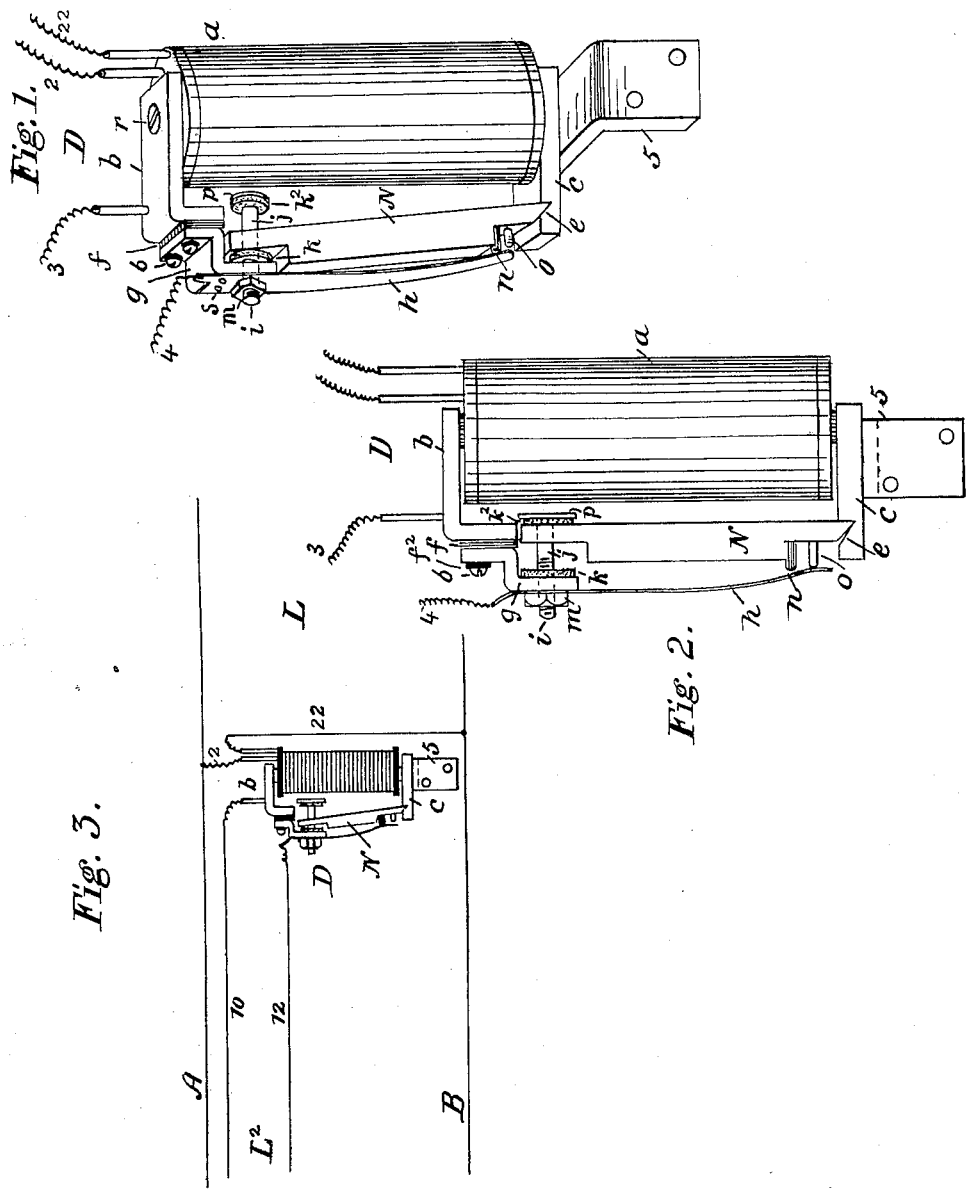

GEORGE K. THOMPSON, OF MALDEN, AND ERNEST C. ROBES, OF MEDFORD, MASSACHUSETTS, ASSIGNORS TO THE AMERICAN BELL TELEPHONE COMPANY, OF BOSTON, MASSACHUSETTS.

SIGNAL-RECEIVING RELAY.

SPECIFICATION forming part of Letters Patent No. 656,796, dated August 28, 1900.

Application filed March 12, 1900. Serial No. 8,339. (No model.)

*To all whom it may concern:*

Be it known that we, GEORGE K. THOMPSON, residing at Malden, and ERNEST C. ROBES, residing at Medford, in the county of Middlesex and State of Massachusetts, have invented certain Improvements in Signal-Receiving Relays, of which the following is a specification.

This invention concerns electrical signaling, and more particularly relates to that class of signal-receiving appliances known as "relays."

Ordinarily when an alternating or pulsatory current is caused to traverse a circuit and through the exciting-helices of an electromagnetic appliance connected therein the armature of such appliance is not subjected to a steady and constant attraction, but vibrates or chatters in the presence of the imperfectly-excited poles of the iron cores of said appliance, and if the said appliance be a relay designed to control a local circuit and a receiving instrument included therein the said local circuit under these conditions is not steadily and constantly closed during the transmission of the main current, its continuity being made intermittent and imperfect in a manner corresponding to the chattering of the main-circuit appliance armature. If a system of selectively signaling a number of stations connected with a single main circuit is arranged under the foregoing conditions, it is apparent unless some means can be devised whereby the steady attraction of the armature of the main-line electromagnetic device can be maintained that when any particular station is signaled the signals at such station will be imperfectly manifested and that there is also a liability of false signals being manifested at the other and undesired stations, owing to the chattering of the armatures there.

The object of our invention is to provide simple and effectual means whereby at any station of a main electric circuit an alternating or pulsatory current flowing in such circuit may be enabled to steadily close and maintain closed a local circuit containing a signal-receiving instrument and effect the satisfactory operation of said instrument.

To this end our invention is a relay which in virtue of its peculiar form and structure is adapted when connected in a main circuit or associated therewith by being placed in a bridge or branch thereof for the control of a local circuit and the operation of a signal-manifesting appliance contained therein to respond to the passage through its coils of alternating or pulsatory electric currents of sufficient strength and appropriate frequency by effectuating and steadily sustaining the attraction of its armature to the operative position thereof and the pursuant closure of a local circuit as long as the transmission of the said current continues and notwithstanding the periodic fall of such current to a zero or minimum value.

Our relay comprises a single-coil electromagnet having laterally-projecting pole-pieces, one of which turns at an angle into a plane parallel to that of the core, while the other is straight; a heavy armature fulcrumed at one end in the straight pole-piece and having its other end between limit-stops in the field of force of the angular pole-piece to be attracted thereby when the magnet by the passage of current through its coils becomes excited; a contact-point and a non-conducting pin, both mounted on the said armature near its fulcrum, and an insulated constant-pressure spring having one end fixed and its other end pressing upon the non-conducting pin while the armature is in its non-attracted position, and upon the contact-point when the said armature is attracted into its forward position, the said insulated spring and contact-point constituting complementary terminals of a local circuit to be controlled by the operation of the relay. The armature by its shape, weight, and adjustment when in its forward or operative position is characterized by very considerable inertia, and this, aided by the constant pressure of the spring, operates to prevent it from dropping back to its resting position when the alternating or pulsatory current flowing in the relay-coils reverses or reaches its zero periods; but the operation of gravity upon the said armature is sufficient to effectuate the retraction thereof whenever the same has time to act, which occurs, of course, on the complete cessation of the main-circuit current flowing through the relay-coils.

The relay which constitutes our present invention is especially-well adapted for use in association with such a system of selective signaling as is disclosed by Letters Patent of the United States No. 644,647, granted to us March 6, 1900, and in some respects may be regarded as an improvement over the form of relay particularly described therein. It is, however, not in any sense restricted in its application to such a system of selective signals, but is applicable to any system wherein the transmission of alternating, pulsatory, or intermittent currents through a main circuit is required to steadily close a local circuit and manifest a signal.

In the drawings which accompany this specification, Figure 1 is a perspective view of our improved relay, showing the armature thereof in its retracted or normal position. Fig. 2 is a side elevation of the relay, showing the armature attracted to its forward or operative position, and Fig. 3 shows the relay connected in a main circuit for the control of a local circuit.

D represents the relay, and $a$ the single electromagnet thereof, preferably wound, and having its magnetic circuit arranged for considerable magnetic inertia or sluggishness of discharge. The terminals 2 and 22 of the exciting-coil of said magnet are brought out of the spool (in practice, of course, to suitable binding-screws) and are adapted for attachment, respectively, to the conductors A and B of any main circuit L. The relay is not polarized, but has a soft-iron-bar core within its coil, provided at its ends, respectively, with soft-iron pole-pieces $b$ and $c$, secured to the core by screws, as at $r$, and projecting laterally therefrom, one pole-piece $c$ being straight, while the other turns at a right angle, as shown, into a plane parallel with the magnet spool and core. The spool is designed to be mounted vertically, with the angular pole-piece uppermost, and the other one may serve as a base, whereby the relay may be secured to a convenient seat or shelf, (shown as a bracket 5.) A notch or V-shaped groove $e$ is made in the upper surface of the pole-piece $c$ for a purpose which will presently appear, and a metal angle-piece $g$ is secured to the outer surface of the pole-piece $b$ by screws 6, but is insulated therefrom by the non-conducting washer $f$ and screw-bushing $f^2$.

N is the relay-armature, formed as a bar of soft iron extending between the pole-pieces parallel with the spool and beveled or brought to an edge at its lower end to rest in the notch or groove $e$, while when so placed its length is such that when attracted by the excitement of the magnet its upper end will clear the downwardly-projecting end of the upper pole-piece and will swing under the same and into line therewith, thus nearly completing the iron magnetic circuit. The middle portion of the armature is much thicker and heavier than the end parts, the additional mass or overhang being upon its outer side, so that whether the armature be in its resting or in its operative position it is unbalanced and its tendency is to be retracted or fall toward the heavier side, though such tendency is obviously weaker in the forward position, since then the fulcrum $e$ is more nearly the center of gravity than when the armature is in its position of rest. A hole is made through the armature near its upper end and a bolt $j$, with a flat enlarged end $p$, is passed through the said hole and screwed into the angle-piece $g$, the said hole through the armature and the bolt $j$ being of such relative size that the armature can swing over the bolt without touching it. A washer $k$, of felt, soft rubber, or like material, is placed on the bolt close to the angle-piece $g$ and another one $k^2$ at the inner face of the enlarged end $p$ to act as buffered or cushioned stops, limiting the forward and backward swings of the armature.

Near the fulcrum $e$ of the armature and inserted in the thinner portion thereof are two pins close to and in line with each other, the upper one, $n$, being made of non-conducting material, such as hard rubber, and the lower one, $o$, of metal. The non-conducting pin or point $n$ is slightly longer than the other. A flat spring $h$ is attached to the angle-piece $g$ by means of the bolt $j$, whose end $i$ passes through a hole therein, and a nut $m$, screwed over the said spring to the said bolt, steadying-pins $s$ and also serving to maintain spring $h$ in place. This spring extends downwardly and is sufficiently long to cover the pins $n$ and $o$ of the armature N. The said spring $h$ is so constructed and adjusted that when the armature is in its retracted or normal position it presses upon the non-conducting pin $n$ and when the armature is attracted forward or into its operative position upon the conducting-pin $o$. The spring $h$ is connected with and is a terminal of one of the conductors, 12, of a local circuit $L^2$, and the conducting point or pin $o$ represents the other conductor, 10, of said circuit, being conductively united thereto through the armature, the core and the pole-pieces connecting wires 4 and 3, respectively, uniting the terminals to the conductors of the local circuit. The local circuit is thus closed when the spring comes into contact with the conducting-pin and opened when it makes contact with the pin $n$. The pressure exerted by the spring $h$ upon the armature N through its alternative engagements with the points $n$ and $o$ tends at all times to move the said armature into its forward position or to maintain the same in such position; but the said pins being both close to the fulcrum $e$ such pressure is at no time great and does not exercise marked influence on the movements of the armature. It does, however, to a certain extent coöperate with the lessened influence of the weight at the back of the armature when the said armature is attracted forward into its operative position to increase its inertia and to sustain its forward position during the intervals of minimum magnetic excitement occurring when the varying exciting-current in the magnet-coils reaches its periodic points of low value.

Our relay operates successfully with an alternating current and also with pulsatory and intermittent currents of frequences such as are used in signaling telephone-substations. When such currents are transmitted through the main circuit and through the winding of the relay D, the said relay is excited and the armature N swings on its fulcrum from the position shown in Fig. 1 to that shown in Fig. 2. In the first position the spring bears upon the non-conducting pin $n$ and the local or controlled circuit is open; but in the latter position the movement of the armature has taken the said pin out of range and has brought the conducting-pin $o$ into range, so that the spring $h$ now bears thereon and closes the controlled circuit. The said circuit being thus closed, any instrument contained therein, together with a source of current, will be operated as long as the spring $h$ and point $o$ remain in contact, and though currents of the characters specified all have a zero-point or a minimum value between each two active impulses the armature N once attracted to its operative position remains there steadily and without chattering, its own inertia, the diminished influence of its weighted part, and the operation of the spring $h$ being together sufficient to prevent it from falling back or from trembling as long as the transmission on the main-line current continues. As a consequence, the spring $h$ and point $o$ remain in contact and maintain the closure of the local circuit and the operation of any instrument contained therein also as long as the said line-current transmission continues; but as soon as the said transmission ceases together the retracting force of gravity has time to overcome the sluggishness of the armature and the auxiliary effect of the spring, and the said armature is retracted and resumes its normal position.

We claim—

1. A relay comprising a vertically-mounted electromagnet having laterally-projecting pole-pieces; a gravity-retracted armature fulcrumed at one end in the lower pole-piece, and having its other end extended into the field of the upper pole-piece and adapted to swing between limiting-stops in said field; a conducting point or stop, and a non-conducting stop, mounted in juxtaposition to one another on said armature near its fulcrum, the latter being slightly longer than the former; and a spring bearing on the said stops alternatively, according as the armature is attracted or retracted, and thereby exerting constant pressure upon the said armature, regardless of the position thereof, in opposition to the retracting force, and in reinforcement of the attracting force; the said spring and conducting-stop constituting mutually-complementary terminals of a controlled circuit, substantially as set forth.

2. The combination in a relay adapted for sluggish operation, of a single-coil electromagnet having laterally-projecting pole-pieces, one turned at an angle into a plane parallel to the magnet, and the other straight; a gravity-retracted normally-unbalanced armature fulcrumed at one end in the straight pole-piece, and having its other end between limit-stops in the field of force of the angular pole-piece to be attracted thereby into a more nearly balanced position when the magnet is excited; a contact-point, and a non-conducting pin, both mounted on the said armature near its fulcrum; and an insulated spring having one end fixed and its other end pressing upon the non-conducting pin when the armature is in its normal position, and upon the contact when the said armature is in its operative position, and thereby exerting a constant force upon the said armature antagonistic to the retractive force of gravity; the said insulated spring and contact-point constituting the local circuit-controlling relay-points; substantially as herein described.

3. The combination in a relay designed for sluggish operation, of the single-coil vertically-mounted electromagnet $a$, having the polar extensions $b$, $c$; with the unbalanced gravity-retracted bar-armature N, fulcrumed in the pole-piece $c$ and subject to the attractive force of the pole-piece $b$ when the same is excited; the independently-supported bolt or stud $j$ extending through a hole in the armature toward the magnet $a$, and carrying the cushioned limit-stops $k\,k^2$ for the said armature; the contact-point $o$ and non-conducting stop $n$ both mounted on the armature near its fulcrum; and the constant-pressure contact-spring $h$ fixed at one end near the pole-piece $b$ and pressing alternatively upon the stop $n$ or the point $o$ according as the armature is at the back or forward limit of its swing, and adapted thereby to maintain an electric circuit open or closed, and to increase the inertia of the said armature in its forward position; substantially as and for the purposes specified.

In testimony whereof we have signed our names to this specification, in the presence of two subscribing witnesses, this 24th day of February, 1900.

GEORGE K. THOMPSON.
ERNEST C. ROBES.

Witnesses:
GEO. WILLIS PIERCE,
JOSEPH A. GATELY.